(12) United States Patent
Feinstein et al.

(10) Patent No.: US 8,027,894 B2
(45) Date of Patent: Sep. 27, 2011

(54) MODELING RESPONSIBLE CONSUMER DEBT CONSOLIDATION BEHAVIOR

(75) Inventors: Jeffrey A. Feinstein, Roswell, GA (US); Shane De Zilwa, Oakland, CA (US)

(73) Assignee: Fair Isaac Corporation, Minneapolis, MN (US)

( * ) Notice: Subject to any disclaimer, the term of this patent is extended or adjusted under 35 U.S.C. 154(b) by 298 days.

(21) Appl. No.: 11/966,820

(22) Filed: Dec. 28, 2007

(65) Prior Publication Data

US 2009/0171757 A1 Jul. 2, 2009

(51) Int. Cl.
*G06Q 40/00* (2006.01)
(52) U.S. Cl. .......................... 705/35; 705/30
(58) Field of Classification Search ............... 705/10–44
See application file for complete search history.

(56) References Cited

U.S. PATENT DOCUMENTS 6,311,169 B2 * 10/2001 Duhon ........................... 705/38
6,405,173 B1    6/2002 Honarvar et al.
7,383,215 B1 *  6/2008 Navarro et al. ............. 705/36 R

OTHER PUBLICATIONS

U.S. Appl. No. 11/832,610, Feinstein, filed Aug. 1, 2007.
U.S. Appl. No. 11/966,798, De Zilwa et al., filed Dec. 28, 2007.

* cited by examiner

*Primary Examiner* — Frantzy Poinvil
(74) *Attorney, Agent, or Firm* — Mintz, Levin, Cohn, Ferris, Glovsky and Popeo, P.C.

(57) ABSTRACT

A request to generate a consolidation risk score that characterizes a likelihood of a change in a level of creditworthiness of an individual following a consolidation of debt of the individual using a secured line of credit is received. Thereafter, future credit balance increases are estimated for the individual using a predictive model trained using historical creditworthiness data of a plurality of consolidators. These estimated future balance increases are then associated with a consolidation risk score so that such score can be provided. Related apparatus, systems, techniques, and articles are also described.

23 Claims, 5 Drawing Sheets

MODELING RESPONSIBLE CONSUMER DEBT CONSOLIDATION BEHAVIOR

RELATED APPLICATION

This application is related to U.S. patent application Ser. No. 11/966,798, filed on Dec. 28, 2007, entitled "MODELING RESPONSIBLE CONSUMER BALANCE ATTRITION BEHAVIOR, the contents of which are hereby fully incorporated by reference.

TECHNICAL FIELD

The subject matter described herein relates to systems and techniques for modeling responsible consumer debt consolidation behavior and, in particular, with characterizing risk associated with the consolidation of debt on a secured instrument such as home equity lines of credit.

BACKGROUND

Consumer indebtedness has become an important issue in the financial industry. Regulators and consumer advocacy groups have been pressuring lenders to avoid business decisions that indebt consumers beyond their ability. Some of these consumers have responded to indebtedness pressures by moving revolving balances away from unsecured credit cards to lower payment credit instruments such as home equity lines of credit (HELOC). Lenders perceive this trend as an increased potential risk among such consumers because some consumers who have trouble managing their credit, are moving balances to collateralized loans, freeing up large amounts of open-to-buy on existing credit cards where subsequent card usage increases total outstanding debt.

SUMMARY

In one aspect, a request to generate a consolidation risk score is received. The consolidation risk score quantifies the responsibility that one brings to the consolidation process, and as a function of this responsibility characterizes a likelihood of a change in a level of creditworthiness of an individual following a consolidation of debt of the individual using a secured line of credit (e.g., HELOC, line of credit secured against equity or debt instruments, etc.). One or more creditworthiness indicators such as future credit balance increases and/or future payment delinquencies are estimated for the individual using a predictive model (e.g., neural network-based model, support vector machine, scorecard, etc.) trained using historical creditworthiness data of a plurality of consolidators (e.g., credit bureau data, masterfile data, etc.). The creditworthiness indicators are associated with a consolidation risk score. Provision of the consolidation risk score (whether by displaying the consolidation risk score, transmitting the consolidation risk score, etc.) is then initiated.

Articles are also described that comprise a machine-readable medium embodying instructions that when performed by one or more machines result in operations described herein. Similarly, computer systems are also described that may include a processor and a memory coupled to the processor. The memory may encode one or more programs that cause the processor to perform one or more of the operations described herein.

The subject matter described herein provides many advantages. For example, by allowing an identification of responsible and irresponsible consolidators before loss exposure occurs, bankcard lenders who are losing balances can proactively evaluate risk, debt sensitivity, and revenue performance. For high risk consolidators, pro-active measures may be taken such as exclusion or reduction of retention efforts for those who consolidate to other secured credit vehicles and to limit subsequent line increases. Other measures such as reduction of authorization pads and of over limit allowances can be implemented. Furthermore, other protective measures such as reducing past due collection windows can be adopted (i.e., number of days for debt to be considered as past due can be reduced, etc.).

The details of one or more variations of the subject matter described herein are set forth in the accompanying drawings and the description below. Other features and advantages of the subject matter described herein will be apparent from the description and drawings, and from the claims.

DETAILED DESCRIPTION

Figure 1:
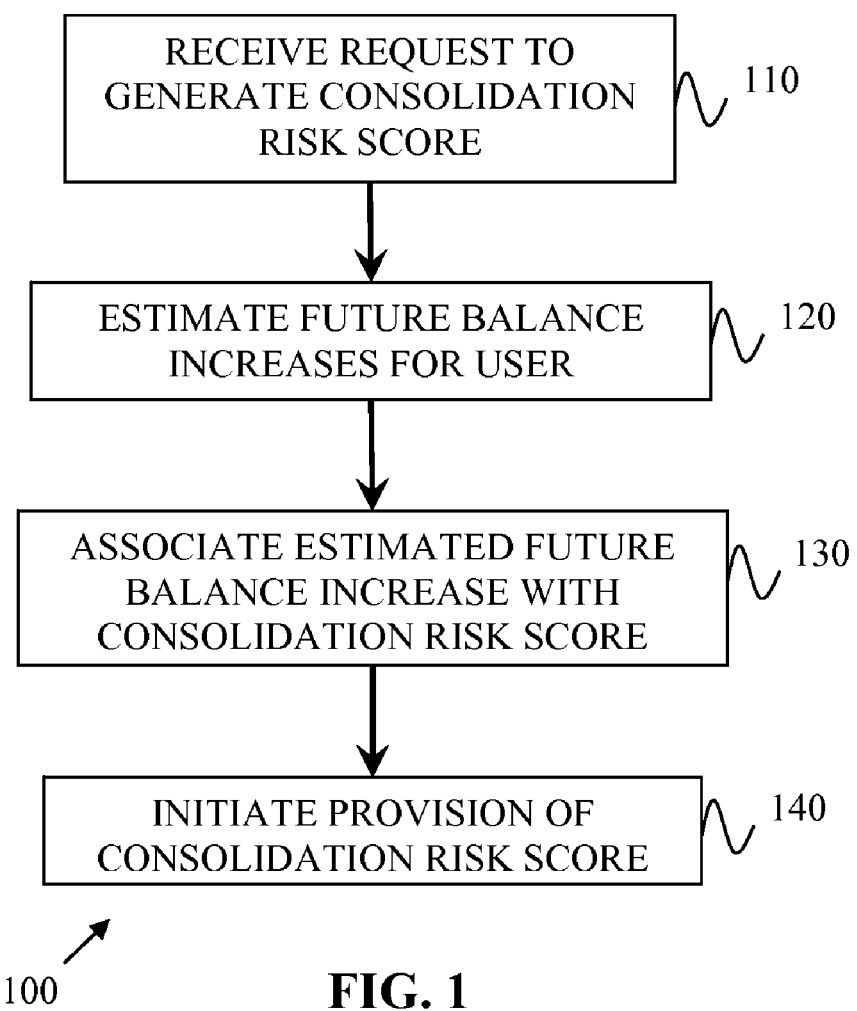
FIG. 1 is a process flow diagram illustrating a technique for predicting creditworthiness of an individual subsequent to the consolidation of debt on to a secured line of credit.

FIG. 1 is a process flow diagram illustrating a method 100, in which, at 110, a request to generate a consolidation risk score is received. This is likely to occur when the opening of a secured line of credit is accompanied by a decrease in balance on an unsecured credit card, when cross-selling of a secured line of credit for the purposes of debt consolidation is being considered, or when an analytic score indicates a consumer has a high probability of consolidation (each being a secured debt consolidation event). The consolidation risk score characterizes a likelihood of a change in a level of creditworthiness of an individual following a consolidation of debt of the individual using a secured line of credit. Thereafter, at 120, one or more creditworthiness indicators such as future credit balance increases and/or future payment delinquencies are estimated for the individual using a predictive model trained using historical creditworthiness data of a plurality of consolidators. The creditworthiness indicators are associated, at 130, with a consolidation risk score. Provision of the consolidation risk score (whether by displaying the consolidation risk score, transmitting the consolidation risk score, etc.) is, at 140, initiated.

Consumers who consolidate debts on a secured instrument such as a HELOC perform consistently to the general population when comparing the odds to score relationships of consolidators (i.e., individuals that have consolidated debt using an instruments such as a HELOC, etc.) and the general population. It was determined that the odds for such HELOC consolidators were slightly better than that of the general population for a fixed FICO score (or other credit scores). Despite these positive results, it was determined that there were potentially problematic trends such as increases in balances over relevant performance windows. Moreover, it was determined that on the whole such consolidators may be a riskier sub-group in general due to:

Lower starting FICO score (pre-consolidation);
Need to consolidate (i.e., adverse selection);
Increase in open-to-buy (i.e., open credit available for purchases) when opening a HELOC to supplement credit cards; and
Lender retention campaigns when high revenue debt migrates away from a credit card.

HELOC openers were identified from credit bureau data as those who open a HELOC shortly after a scoring date. 'Consolidators' were identified as those individuals that had a month-to-month masterfile (i.e., merchant and/or payment card data characterizing a balance of a single user as opposed to aggregated data generated from a plurality of merchants) revolving balance decrease of over $1,000 during any of the three months immediately after the HELOC was opened. HELOC openers with no such balance decrease were considered 'non-consolidators'. For current purposes, a consolidator can also generally be characterized as an individual that transfers debt to a secured line of credit such as a HELOC and that other criteria for specifying consolidators and non-consolidators may be utilized.

Predictive profiling using the techniques described herein show that, compared to non-consolidators and on the whole, consolidators have lower FICO scores; primarily due to higher balances and utilization (hence the need to consolidate) and more delinquency (indicating these are consumers who struggle with debt). Consistent with a trend towards prior attempts to manage debt, it was determined that consolidators have more instances of previously opened credit lines and more instances of decreasing payment card revolving balance by $1,000 or more.

Figure 2:
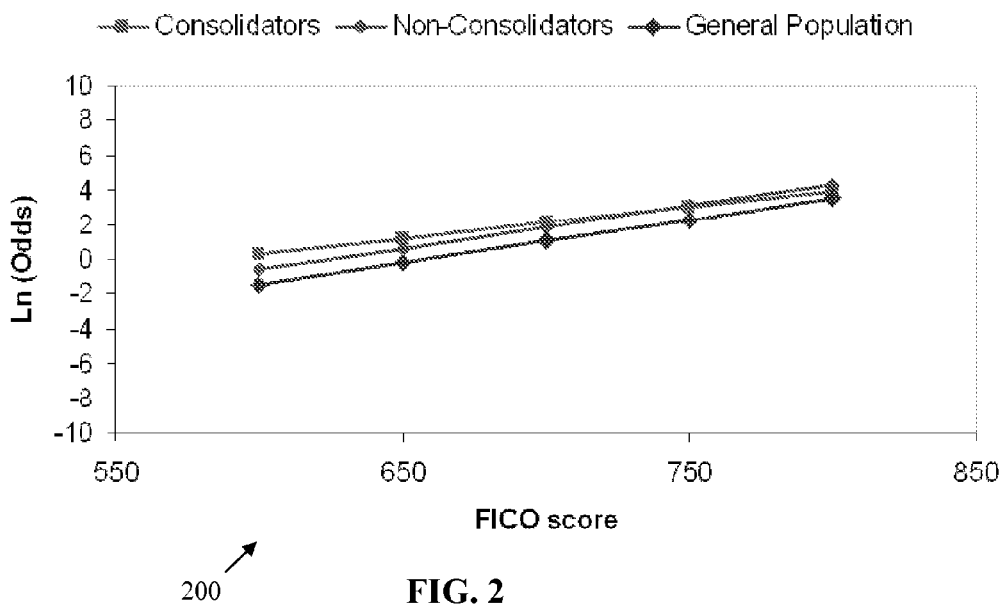
FIG. 2 is a graph illustrating FICO odds-to-score alignment of HELOC consolidators, HELOC non-consolidators and the general population.

While the profiling results paint a picture of a riskier sub-population, the odds-to-score diagram 200 of FIG. 2 illustrates that both consolidators and non-consolidators perform slightly better than the general population at a fixed FICO score. Specifically, for a given score (x-axis), consolidators and non-consolidators have slightly better odds (y-axis) than the general population.

Figure 3:
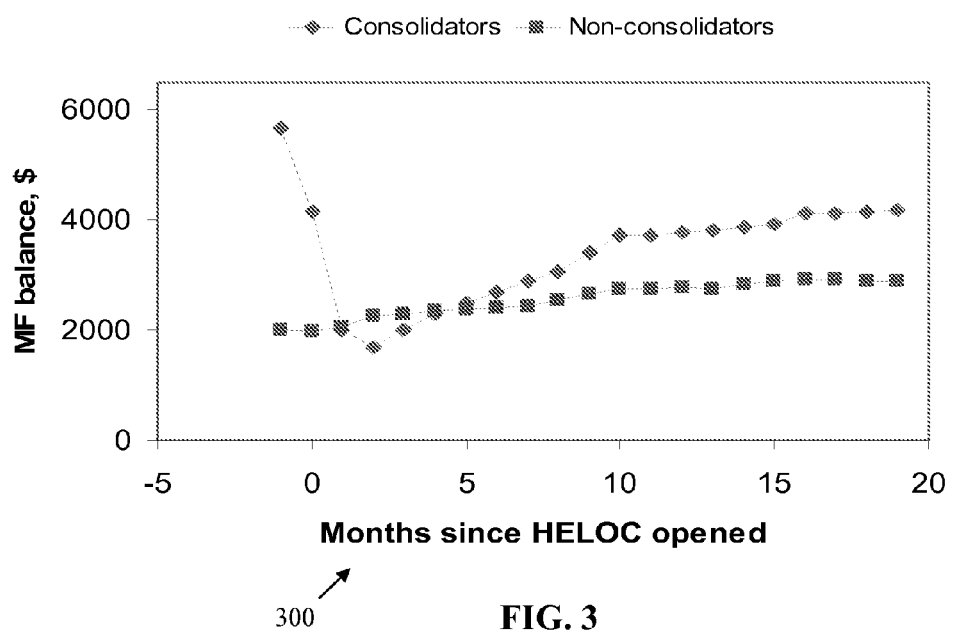
FIG. 3 is a graph illustrating masterfile balance changes of consolidators and non-consolidators subsequent to the opening of a HELOC.

However, the diagram 300 of FIG. 3 illustrates consolidators reverting to higher bankcard usage following the initial consolidation. In the months following the HELOC opening (x-axis), there is a dramatic decline in the masterfile (MF) balance on the payment card (y-axis) among consolidators and this balance decrease identifies the consolidation. However, this balance increases steadily following the consolidation. A similar pattern was observed on credit bureau total balance increases. The consolidators become more indebted over the time period following consolidation.

Figure 4:
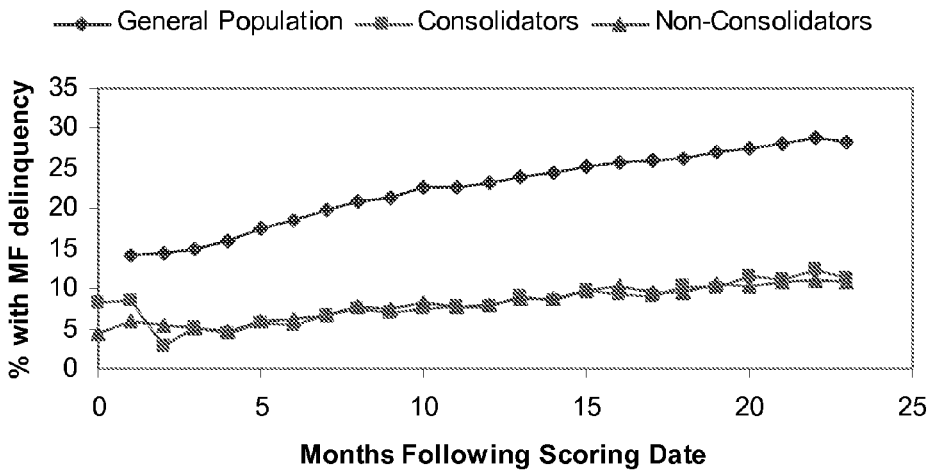
FIG. 4 is a graph illustrating masterfile delinquency of consolidators and non-consolidators subsequent to the opening of a HELOC.

Despite this increase in debt, it was determined that credit card issuers do not see signs of increased delinquency on their own masterfile performance. In the diagram 400 of FIG. 4, month-to-month (x-axis) percentages of consumers with a delinquency on their credit card (y-axis) are illustrated. Both consolidators and non-consolidators have dramatically less delinquency than does the general population.

Figure 5:
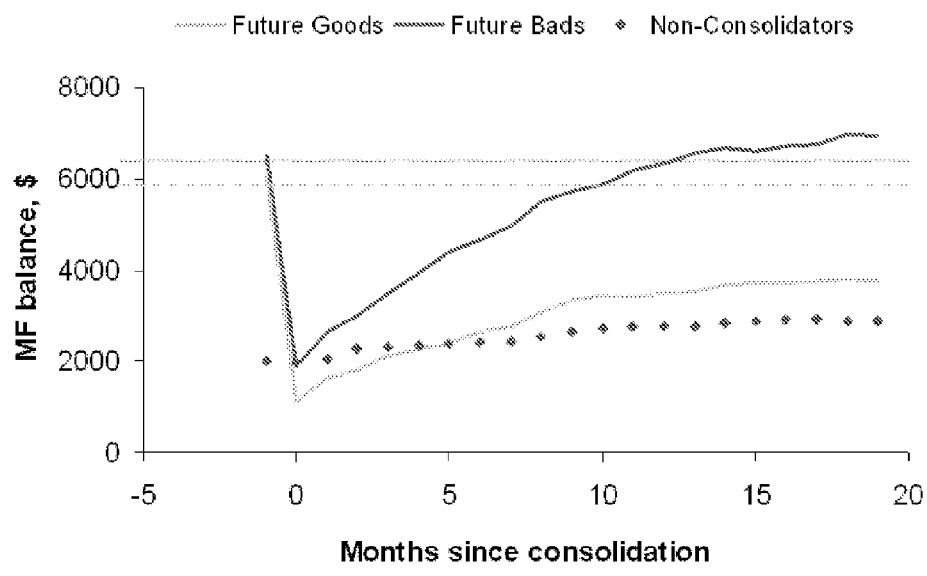
FIG. 5 is a graph illustrating masterfile balance changes of future good and bad performance consolidators subsequent to the opening of a HELOC.

To learn more about the balance increase trend in FIG. 3, consolidators who eventually went bad on their credit bureau report relative to those who successfully paid all of their credit obligations during the performance period were examined and it was found that the month-to-month (x-axis) future balance increase (y-axis) following the consolidation differed dramatically for these two populations (see diagram 500 of FIG. 5). Based on such information, consolidators can be segmented into responsible and irresponsible subgroups:

'Irresponsible' consolidators have a large masterfile balance increase after consolidation. Whether they consolidated for the right (e.g., reduce monthly payments, recover from indebtedness, etc.) or wrong reasons (e.g., bankruptcy fraud, exploit open-to-buy, etc.), they eventually revert to high credit card usage.

'Responsible' consolidators do not have a large masterfile balance increase after consolidation. They generally avoid reverting to high card usage and use the consolidation to save money and to recover from indebtedness.

Figure 6:
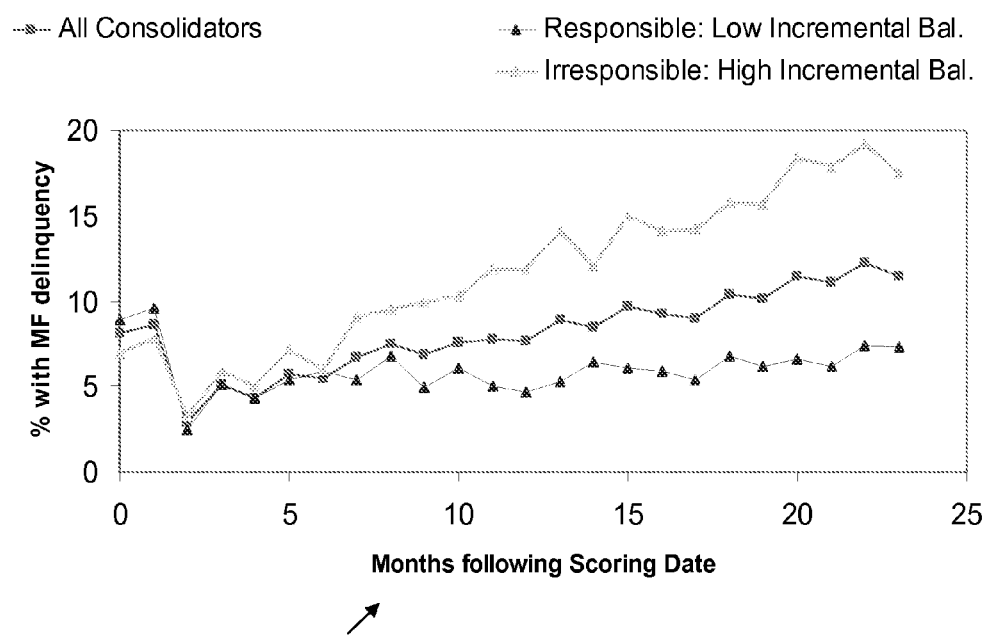
FIG. 6 is a graph illustrating masterfile delinquency rates for responsible and irresponsible consolidators subsequent to the opening of a HELOC.

Differentiating between the responsible and irresponsible subgroups, by virtue of increase in masterfile following consolidation, can be used to help differentiate future bankcard delinquency. This trend can be seen in the diagram 600 of FIG. 6 where the irresponsible consolidators have a dramatic rise in month-to-month (x-axis) delinquency (y-axes) compared to the responsible consolidators.

Figure 7:
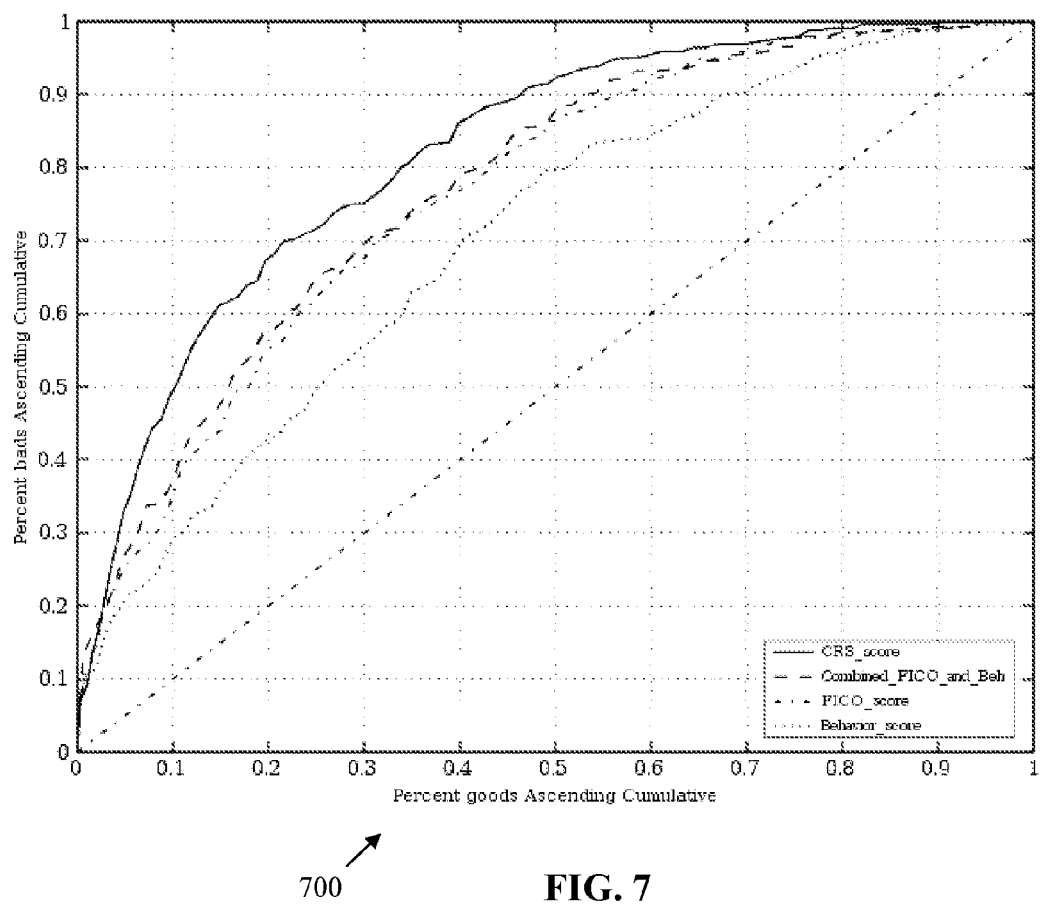
FIG. 7 is a graph illustrating performance of consolidator risk score versus FICO, behavior, and FICO/behavior combined.

As future balance change and future performance are in-actionable at the time of scoring, a model based on credit bureau data can be used to predict consolidator performance (it will be appreciated that the model could alternatively or in addition be based on masterfile data). This model, the consolidator risk score (CRS), predicts consolidator risk very effectively and differentiated masterfile delinquency as effectively as future balance increase (see FIG. 6). The CRS performs better than Behavior Score (e.g., a score based on customer behavior with a single institution including credit limit, number of times the limit was exceeded, spending patterns, etc.), FICO Score, and an optimized combination of FICO and Behavior Scores in predicting performance of consolidators (see diagram 700 of FIG. 7).

Lenders can use the CRS to better inform the likely future behavior of consolidators and to improve strategies and tracking of these consumers. The CRS provides a potential opportunity for issuers to take action to mitigate loss from high risk consolidators. In particular, it can be used prior to cross-sell HELOCs (or other secured lines of credit) for debt consolidation purposes, and for account management of the credit card from which balances were moved or the HELOC, (or other secured line of credit) once the HELOC is opened.

The predictive model used herein to generate the CRS can be based, for example, on a scorecard model developed using Future Action Impact Modeling (FAIM) (see, for example, U.S. patent application Ser. No. 11/832,610, filed on Aug. 1, 2007, the contents of which are hereby fully incorporated by reference) and/or the ModelBuilder™ software suite of Fair Isaac Corporation. In some implementations, a divergence-based optimization algorithm is trained using the data obtained from a large number of consolidators, including their credit history, corresponding credit scores, subsequent credit bureau (or in some variations, masterfile) balance increases and credit performance. The underlying model may alternatively use a variety of predictive technologies, including, for example, neural networks, support vector machines, and the like in order to predict future creditworthiness of a single user based on historical data from a large number of users.

Various implementations of the subject matter described herein may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the term "machine-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

The subject matter described herein may be implemented in a computing system that includes a back-end component (e.g., as a data server), or that includes a middleware component (e.g., an application server), or that includes a front-end component (e.g., a client computer having a graphical user interface or a Web browser through which a user may interact with an implementation of the subject matter described herein), or any combination of such back-end, middleware, or front-end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

Although a few variations have been described in detail above, other modifications are possible. For example, the logic flow depicted in the accompanying figures and described herein do not require the particular order shown, or sequential order, to achieve desirable results. In addition, it will be appreciated that the current subject matter is applicable to a wide variety of secured lines of credit and loans and is not limited to HELOC consolidation. Other embodiments may be within the scope of the following claims.

What is claimed is:

1. An article comprising a machine-readable medium embodying instructions that when performed by one or more machines result in operations comprising:
    receiving a request to generate a consolidation risk score, the consolidation risk score characterizing a likelihood of a change in a level of creditworthiness of an individual following a consolidation of debt of the individual using a secured line of credit;
    estimating future credit balance increases for the individual using a predictive model trained using historical creditworthiness data of a plurality of consolidators;
    associating the estimated future balance increases with a consolidation risk score; and
    initiating provision of the consolidation risk score.

2. An article as in claim 1, wherein the secured line of credit is a home equity line of credit.

3. An article as in claim 1, wherein the estimated future credit balance increases are masterfile balance increases.

4. An article as in claim 1, wherein the estimate future credit balance increases are credit bureau balance increases.

5. An article as in claim 1, wherein the consolidation risk score is provided by displaying the consolidation risk score.

6. An article as in claim 1, wherein the consolidation risk score is provided by transmitting the consolidation risk score over a communications network to a remote user.

7. An article as in claim 1, wherein the predictive model is a scorecard model.

8. Method for implementation by one or more data processors comprising:
    receiving, by at least one data processor, a request to generate a consolidation risk score, the consolidation risk score characterizing a likelihood of a change in a level of creditworthiness of an individual following a consolidation of debt of the individual using a secured line of credit;
    estimating, by at least one data processor, future credit balance increases for the individual using a predictive model trained using historical creditworthiness data of a plurality of consolidators;
    associating, by at least one data processor, the estimated future balance increases with a consolidation risk score; and
    initiating, by at least one data processor, provision of the consolidation risk score.

9. A computer-implemented method as in claim 8, wherein the secured line of credit is a home equity line of credit.

10. A computer-implemented method as in claim 8, wherein the estimated future credit balance increases are masterfile balance increases.

11. A computer-implemented method as in claim 8, wherein the estimate future credit balance increases are credit bureau balance increases.

12. A computer-implemented method as in claim 8, wherein the consolidation risk score is provided by displaying the consolidation risk score.

13. A computer-implemented method as in claim 8, wherein the consolidation risk score is provided by transmitting the consolidation risk score over a communications network to a remote user.

14. A computer-implemented method as in claim 8, wherein the predictive model is a scorecard model.

15. An apparatus comprising:
    means for receiving a request to generate a consolidation risk score, the consolidation risk score characterizing a likelihood of a change in a level of creditworthiness of an individual following a consolidation of debt of the individual using a secured line of credit;
    means for estimating future credit balance increases for the individual using a predictive model trained using historical creditworthiness data of a plurality of consolidators;
    means for associating the estimated future balance increases with a consolidation risk score; and
    means for initiating provision of the consolidation risk score.

16. An apparatus as in claim 15, wherein the secured line of credit is a home equity line of credit.

17. An apparatus as in claim 15, wherein the estimated future credit balance increases are masterfile balance increases.

18. An apparatus as in claim 15, wherein the estimate future credit balance increases are credit bureau balance increases.

19. An apparatus as in claim 15, wherein the consolidation risk score is provided by displaying the consolidation risk score.

20. An apparatus as in claim 15, wherein the consolidation risk score is provided by transmitting the consolidation risk score over a communications network to a remote user.

21. An apparatus as in claim 15, wherein the predictive model is a scorecard model.

22. An article comprising a machine-readable medium embodying instructions that when performed by one or more machines result in operations comprising:
receiving a request to generate a consolidation risk score in response to a secured debt consolidation event, the consolidation risk score characterizing a likelihood of a change in a level of creditworthiness of an individual following a consolidation of debt of the individual using a home equity line of credit;
estimating future masterfile balance increases for the individual using a predictive model trained using historical creditworthiness data of a plurality of consolidators derived from credit bureau data;
associating the estimated future masterfile balance increases with a consolidation risk score; and
initiating provision of the consolidation risk score.

23. An article comprising a machine-readable medium embodying instructions that when performed by one or more machines result in operations comprising:
receiving a request to generate a consolidation risk score, the consolidation risk score characterizing a likelihood of a change in a level of creditworthiness of an individual following a consolidation of debt of the individual using a secured line of credit;
estimating future payment delinquencies for the individual using a predictive model trained using historical creditworthiness data of a plurality of consolidators;
associating the estimated future payment delinquencies with a consolidation risk score; and
initiating provision of the consolidation risk score.

* * * * *